US012751438B2

(12) United States Patent
Miyamoto

(10) Patent No.: US 12,751,438 B2
(45) Date of Patent: Oct. 6, 2026

(54) ELECTRIC FISHING REEL

(71) Applicant: GLOBERIDE, INC., Higashikurume (JP)

(72) Inventor: Issei Miyamoto, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 132 days.

(21) Appl. No.: 18/762,972

(22) Filed: Jul. 3, 2024

(65) Prior Publication Data

US 2025/0120380 A1 Apr. 17, 2025

(30) Foreign Application Priority Data

Oct. 16, 2023 (JP) ................................ 2023-178001

(51) Int. Cl.
*A01K 89/017* (2006.01)

(52) U.S. Cl.
CPC ................................ *A01K 89/017* (2013.01)

(58) Field of Classification Search
None
See application file for complete search history.

(56) References Cited

U.S. PATENT DOCUMENTS 3,979,081 A * 9/1976 Miyamae ............ A01K 89/017 242/318
4,598,878 A * 7/1986 Steffan ................ A01K 89/017 242/263
4,784,346 A * 11/1988 Steffan ................ A01K 89/017 477/17
5,954,285 A * 9/1999 Whisenhunt ......... A01K 89/017 254/362
2003/0038200 A1 2/2003 Chiba
2006/0283998 A1* 12/2006 Ono .................... A01K 89/017 242/253
2008/0073455 A1* 3/2008 Terauchi ............. A01K 89/017 242/250
2017/0280697 A1* 10/2017 Nonogaki ............. H02K 5/203

FOREIGN PATENT DOCUMENTS

| | | | |
|---|---|---|---|
| CN | 103814875 | A | 5/2014 |
| CN | 110710502 | A | 1/2020 |
| JP | 2002-142625 | A | 5/2002 |
| JP | 2007-252330 | A | 10/2007 |
| JP | 2010-029145 | A | 2/2010 |
| JP | 2014113142 | * | 6/2016 |
| TW | 202010404 | A | 3/2020 |

OTHER PUBLICATIONS

Feb. 13, 2025 Office Action issued in Taiwanese Patent Application No. 113135601.
May 20, 2026 Office Action issued in Chinese Application No. 202411313021.9.

* cited by examiner

*Primary Examiner* — William A. Rivera
(74) *Attorney, Agent, or Firm* — Oliff PLC

(57) ABSTRACT

An electric fishing reel of the present invention comprises a drive motor that is provided in a frame of a reel main body and rotationally drives a spool around which a fishing line is wound. The drive motor comprises a motor case that houses a motor component and is attached to the frame, and a set plate is attached to the frame. Then, the motor case is fitted to the set plate by a fitting structure.

3 Claims, 9 Drawing Sheets

ELECTRIC FISHING REEL

CROSS-REFERENCE TO RELATED APPLICATION

This application claims priority under 35 U.S.C. § 119 to Japanese Patent Application No. 2023-178001 filed on Oct. 16, 2023 in the Japanese Patent Office, the entire contents of each hereby incorporated by reference.

BACKGROUND OF THE INVENTION

1. Technical Field

The present invention relates to an electric fishing reel in which a fishing line is wound around a spool by an output from a drive motor supported on a reel main body.

2. Description of the Related Art

Normally, as disclosed in JP 2007-252330 A, for example, an electric fishing reel has a structure in which a spool is rotationally driven by driving of a drive motor supported by a frame of a reel main body to wind a fishing line. The output from the drive motor is decelerated via a deceleration mechanism such as a planetary gear mechanism and transmitted to a drive shaft of the spool. Further, the drive motor is housed in a motor case supported by the frame, and a set plate supporting a planetary gear mechanism, a bearing component, and the like constituting the deceleration mechanism is attached to the frame.

SUMMARY OF THE INVENTION

Recently, the size of the electric fishing reel has been reduced so that the electric reel can be handled by hand, and it is preferable that the output of the drive motor is not reduced as much as possible. However, in the conventional electric fishing reel, since the set plate is attached to the motor case supported by the frame as described above, cumulative tolerances are increased (tolerances from the motor case to the frame and from the frame to the set plate are accumulated), and it is difficult to achieve coaxiality. Therefore, there is a high possibility that the output of the drive motor is reduced because the coaxial axis is not provided.

The present invention has been made in view of the above problems, and an object thereof is to provide an electric fishing reel in which a reduction in output of a drive motor is less likely to occur.

In order to achieve the above object, an electric fishing reel of the present invention comprises a drive motor that is provided in a frame of a reel main body and rotationally drives a spool around which a fishing line is wound, and comprises a motor case that houses a motor component of the drive motor and is attached to the frame, a set plate attached to the frame, and a fitting structure that fits the motor case to the set plate.

In the above-described electric fishing reel, since the motor case is fitted to the set plate, it is possible to reduce the accumulated tolerance. That is, when the tolerance is large, transmission efficiency of driving force is lowered because components such as a bearing are slightly misaligned with respect to an output shaft of the drive motor, but as described above, by integrating the motor case and the set plate by the fitting structure, the output shaft of the drive motor and a deceleration mechanism, a bearing component, and the like disposed on the set plate are easily coaxial, and it is possible to suppress a decrease in the output of the drive motor when the driving force is transmitted.

According to the present invention, it is possible to obtain an electric fishing reel which hardly causes a decrease in output of a drive motor.

DETAILED DESCRIPTION

Hereinafter, an embodiment of an electric fishing reel according to the present invention will be described with reference to FIGS. 1 to 8. Note that, in the following description, a front-rear direction, a left-right direction, and an up-down direction are defined as the directions illustrated in FIG. 1, the front-rear direction is defined as an axial direction of a fishing rod when the fishing rod is attached, the left-right direction is defined as an axial direction of an output shaft of a drive motor, and the up-down direction is defined as a direction orthogonal to the front-rear direction and the left-right direction.

Figure 1:
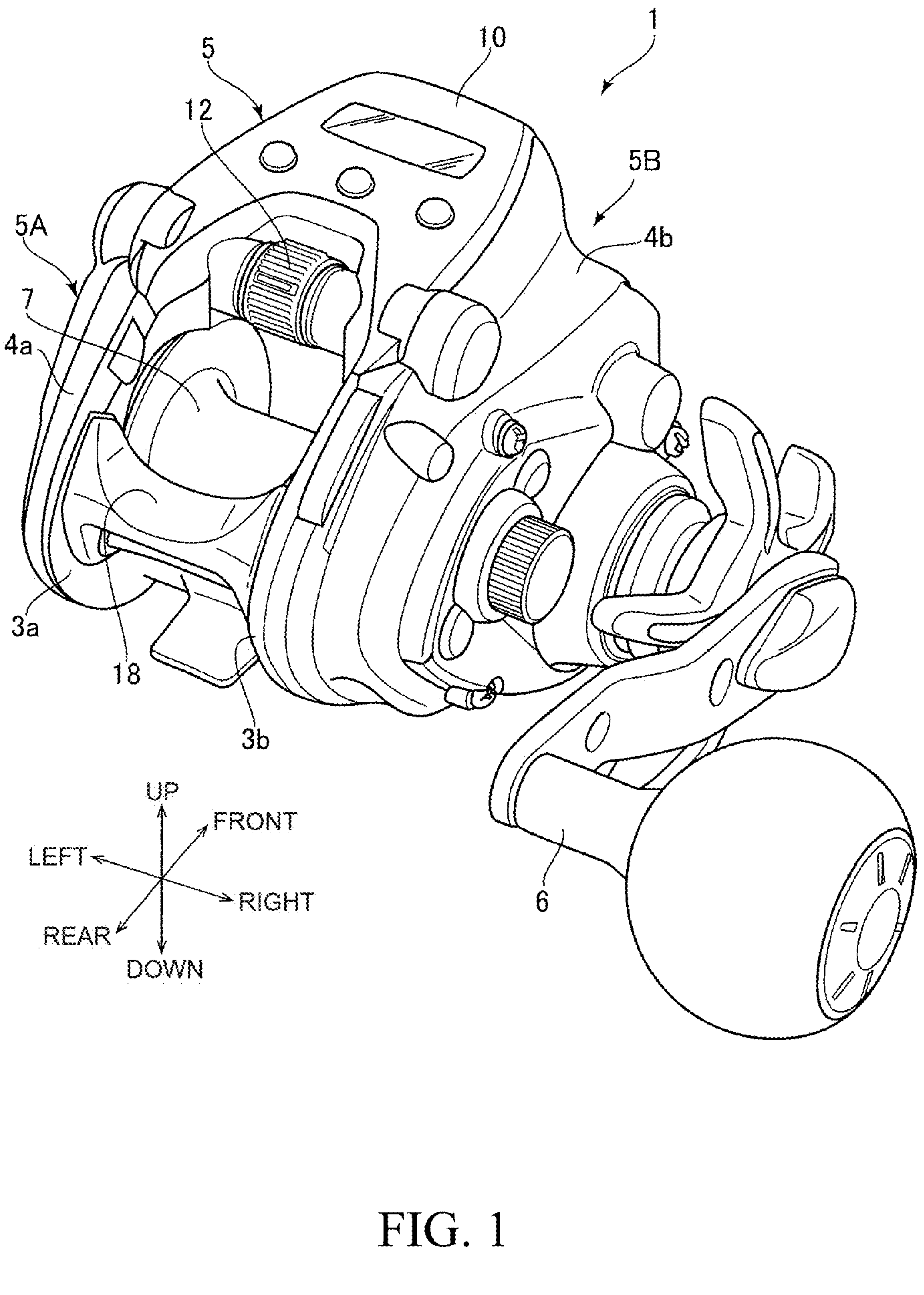
FIG. 1 is a perspective view illustrating an embodiment of an electric fishing reel according to the present invention.
Figure 2:
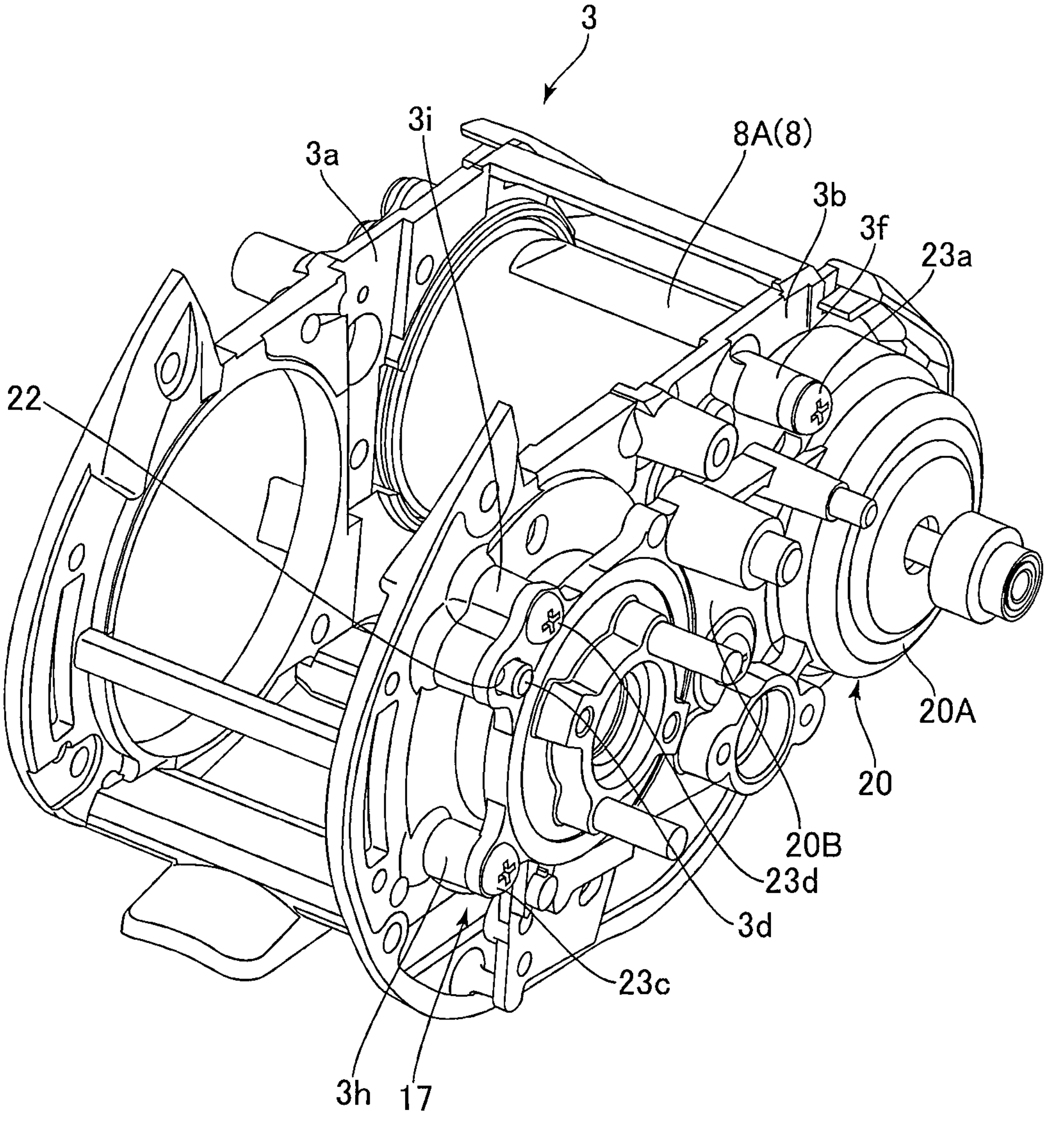
FIG. 2 is a perspective view of a schematic configuration of a frame constituting a reel main body and a set plate attached to the frame as viewed from a rear side.
Figure 3:
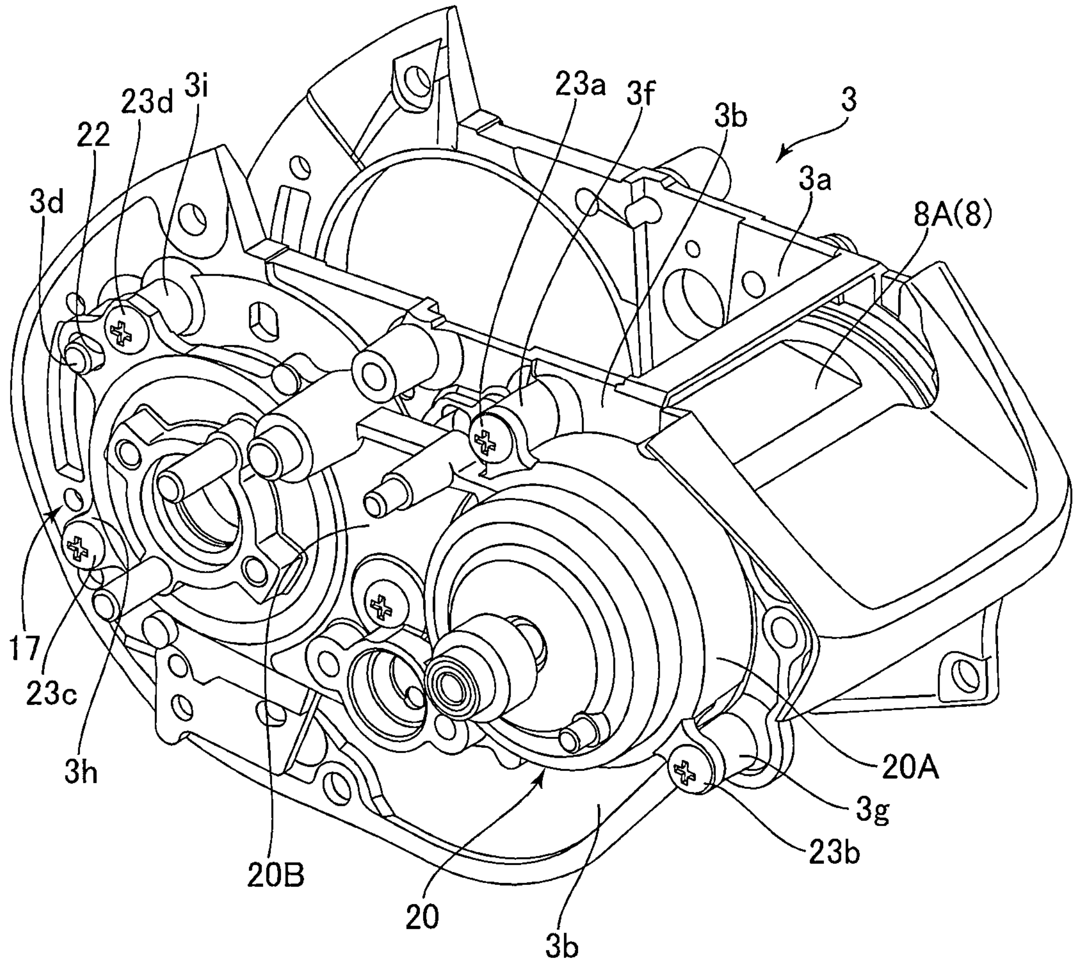
FIG. 3 is a perspective view of the schematic configuration of the frame constituting the reel main body and the set plate attached to the frame as viewed from a front side.
Figure 4A:
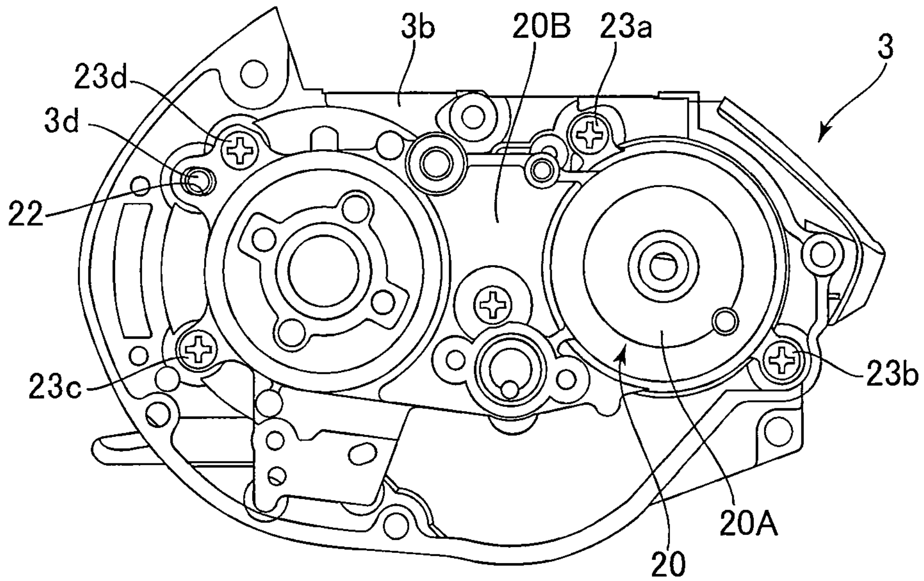
FIG. 4A is a side view of the frame.
Figure 4B:
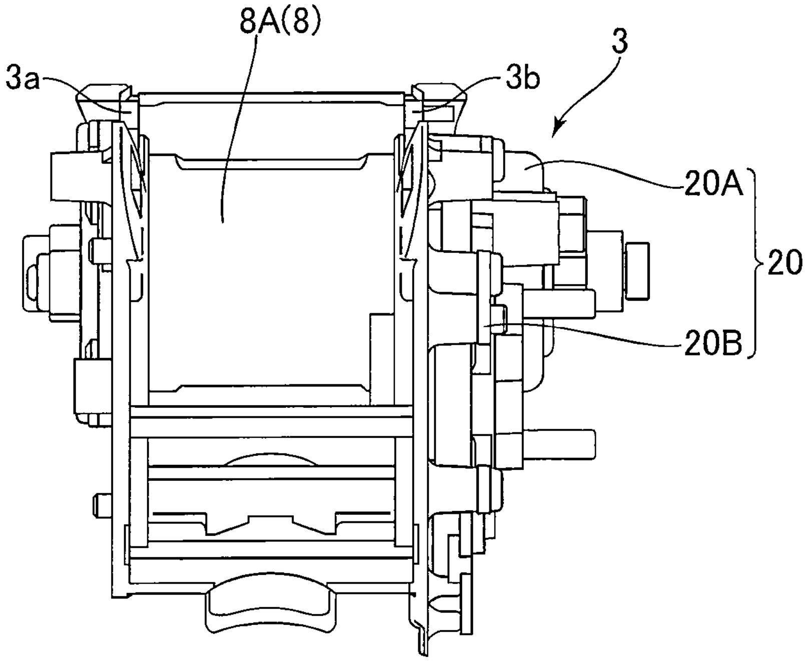
FIG. 4B is a rear view of the frame.
Figure 5A:
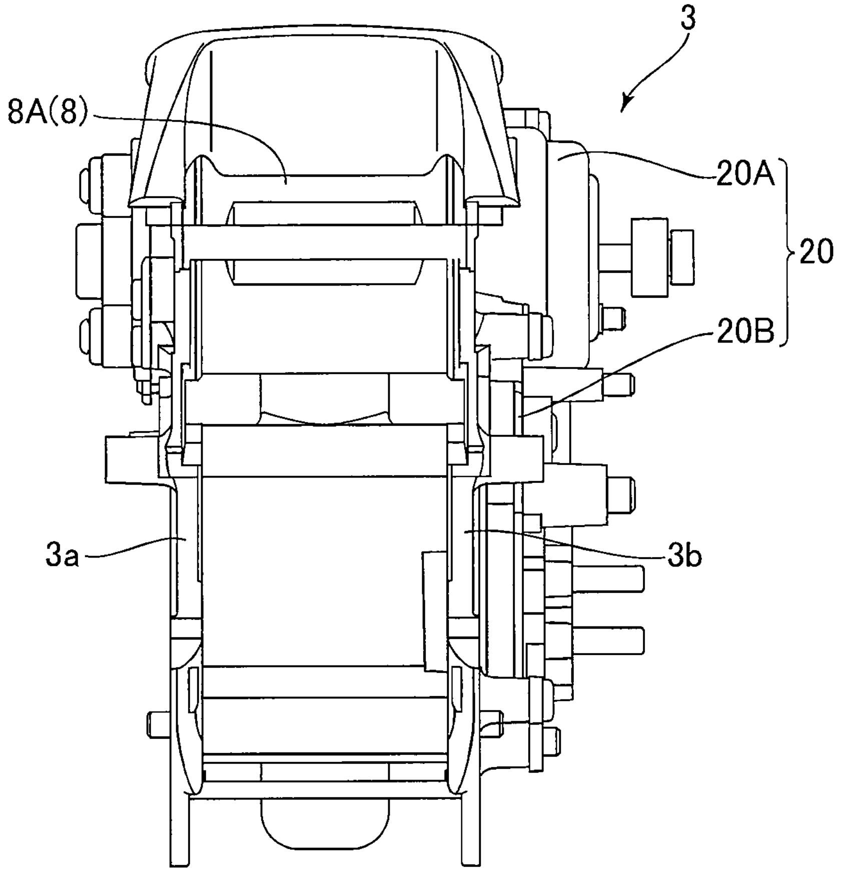
FIG. 5A is a plan view of the frame.
Figure 5B:
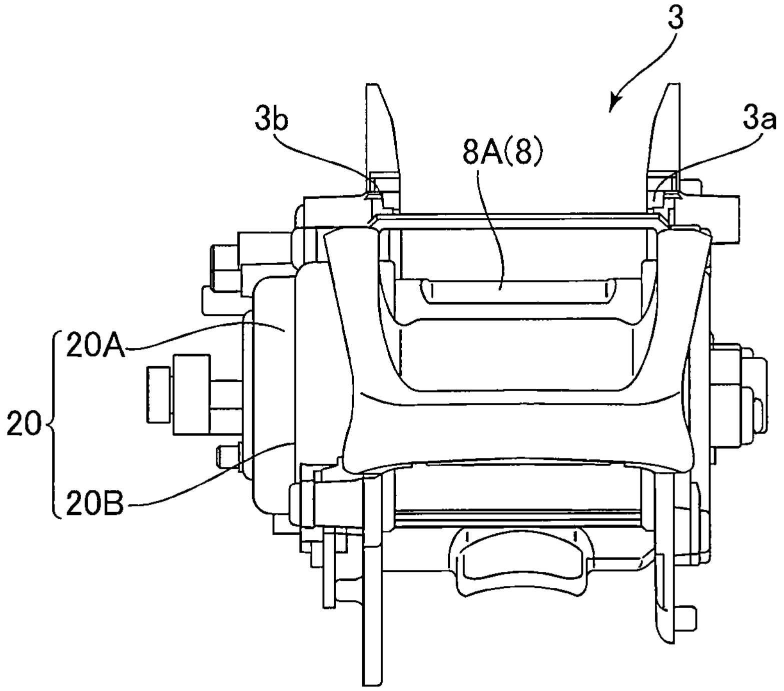
FIG. 5B is a front view of the frame.

As illustrated in FIGS. 1 to 5B, an electric fishing reel 1 according to the present embodiment comprises a reel main body 5 comprising left and right side plates 5A and 5B configured by attaching left and right covers 4*a* and 4*b* to left and right frames 3*a* and 3*b*. As illustrated in FIGS. 2 and 3, the left and right frames 3*a* and 3*b* are connected in the left-right direction to form an integrated structure (the integrated structure is also referred to as a frame 3).

A manual handle 6 to be wound is provided on one side plate (right side plate 5B) side constituting the reel main body 5, and a spool 7 around which a fishing line is wound is rotatably supported between the left and right side plates 5A and 5B. Further, in the present embodiment, the drive motor 8 is held between the left and right frames 3*a* and 3*b* on the front side of the spool 7 (FIGS. 2 to 5B). The spool 7 is rotationally driven in a fishing line winding direction by a winding operation of the manual handle 6 and the rotational drive of the drive motor 8. Note that although the drive motor 8 may be installed inside the spool 7, by installing the drive motor 8 in front of the spool 7 as in the present embodiment, the reel main body 5 can be made as compact as possible while ensuring a line winding amount of the spool 7.

A box-shaped control case 10 housing a control unit that controls the drive motor 8 is disposed above the spool 7 between the left and right side plates 5A and 5B. Further, an operation member 12 that adjusts output of the drive motor 8 is disposed in a rear portion of the control case 10. The operation member 12 of the present embodiment has a dial form provided on a support shaft rotatably supported behind the control case 10, and is configured to adjust the output of the drive motor by rotating the operation member 12 in the front-rear direction.

Further, in the frame 3 (the right frame 3*b* in the present embodiment), a known clutch mechanism 17 (FIGS. 2 and 3) that switches the spool 7 to a fishing line winding state/free rotation state is disposed. The clutch mechanism 17 has a function of connecting and disconnecting power transmission from the manual handle 6 and the drive motor 8 to the spool 7, and is configured to switch from a clutch-ON state to a clutch-OFF state by a clutch operation member 18 disposed on the rear side of the spool 7 so as to be displaceable in the up-down direction. That is, when the clutch operation member 18 is pushed down in the clutch-ON state (power transmission state) illustrated in FIG. 1, the state is switched to the clutch-OFF state.

Note that returning from the clutch-OFF state to the clutch-ON state can be automatically performed by a winding operation of the manual handle 6, driving of the drive motor 8, or the like.

A set plate 20 to be described later is disposed between the right frame 3*b* and the right cover 4*b*. An engagement hole 22 is formed on a rear end side of the set plate 20, and provides a proof by fitting the engagement hole 22 on a protrusion 3*d* formed in the right frame 3*b*, and in this state, a plurality of screws 23*a* to 23*d* is screwed from the outside into screw holes (which may be screw holes formed in bosses) 3*f* to 3*i* formed in the right frame 3*b* in this state, thereby fixing the set plate 20 non-rotationally to the right frame 3*b*.

Next, configurations of the drive motor 8 and the set plate 20 will be described with reference to FIGS. 6 to 8. As is known, the drive motor 8 comprises motor components such as a magnet forming a magnetic field along a circumferential direction, an armature having a coil wound so as to face the magnet, and a commutator attached to an end of the output shaft 8*a*, and these motor components are housed on a radially inner side of a motor case 8A formed in a substantially cylindrical shape. Further, the output from the output shaft 8*a* of the drive motor 8 is decelerated by a deceleration mechanism 30 installed on the right frame side and transmitted to the spool 7 via a driving force transmission mechanism 40.

The set plate 20 houses the deceleration mechanism 30 on the right frame side and supports gears 41 and 42 constituting the driving force transmission mechanism 40, a bearing component 50, and the like. That is, the set plate 20 of the present embodiment comprises a housing part 20A that houses the deceleration mechanism 30 provided on the output shaft 8*a* of the drive motor 8, and a gear support portion 20B that supports the gears 41 and 42 constituting the driving force transmission mechanism.

The motor case 8A is open on both sides in the axial direction, the right frame side is closed by the set plate 20, and the left frame side is closed by a lid member 26 fixed to the left frame 3*a*. Further, the output from the output shaft 8*a* of the drive motor 8 is decelerated by a deceleration mechanism 30 installed on the right frame side and transmitted to the spool 7 via a driving force transmission mechanism 40.

Further, the motor case 8A is not integrally formed with the frame 3, but is formed in a cylindrical shape as a member different from the frame by using, for example, metal such as aluminum, titanium, or magnesium, resin, FRP, or the like. That is, the motor case can be formed by a material different from the material of the frame 3, and the output shaft 8*a* and the motor components such as a magnet, an armature, and a commutator as described above are mounted inside such a motor case.

The housing part 20A is formed in a substantially cylindrical shape bulging in the axial direction with respect to the gear support portion 20B, and the deceleration mechanism 30 is housed in an internal space thereof. As is known, the deceleration mechanism 30 of the present embodiment comprises a planetary gear mechanism (two stages) attached to the output shaft 8*a* of the drive motor 8, and comprises sun gears 31*a* and 31*b* attached to the output shaft 8*a*, planetary gears 32*a* and 32*b* meshing with sun gears 31*a* and 31*b*, and an internal gear 33 comprising the internal teeth 33*a* meshing with planetary gears 32*a* and 32*b*. External teeth 33*b* are formed on an outer peripheral surface of the internal gear 33, and rotational driving decelerated by the deceleration mechanism 30 is output to the gears 41 and 42 constituting the driving force transmission mechanism 40 via the external teeth 33*b*.

Normally, since the side plate (the cover) is an external component and is often formed of a curved surface, the deceleration mechanism 30 and the driving force transmission mechanism 40 cannot be fixed and disposed at appropriate positions only with the side plate. On the other hand, by disposing the set plate 20 as described above, the deceleration mechanism 30 and the driving force transmission mechanism 40 can be disposed at appropriate positions, and the ease of incorporation and maintainability can be improved. In addition, by providing the bulging housing part 20A that houses the deceleration mechanism 30 in the set plate 20, the width direction of the reel main body can be made compact.

The motor case 8A and the set plate 20 have a fitting structure in which the motor case 8A is fitted to the set plate 20. That is, the present invention is configured so that the motor case 8A is fitted to the set plate 20 instead of supporting the motor case on the frame and fixing the set plate to the frame as in the conventional case.

As described above, by fitting the motor case 8A to the set plate 20, it is possible to reduce the cumulative tolerance from the motor case to the frame and from the frame to the set plate as in the related art, and it becomes easy to make the output shaft 8*a* of the drive motor 8 coaxial with the deceleration mechanism 30, the bearing component, and the like, and it is possible to suppress a decrease in the motor output.

In the fitting structure in the present embodiment, a protrusion 8*b* is formed on the motor case 8A side, and a recess 20*b* into which the protrusion 8*b* can be fitted is formed on the set plate 20 side. In this case, since the motor case 8A is formed in a cylindrical shape having a substantially circular cross section centered on the output shaft 8*a*, the protrusion 8*b* is formed in an annular shape in which an outer end edge having a maximum diameter extends in the axial direction. In addition, the recess 20*b* on the set plate 20 side is constituted by an annular groove extending in the axial direction on an inner surface of an inner front edge so that the housing part 20A can be formed in a similar circular shape and the protrusion 8*b* formed in an annular shape can be fitted.

Specifically, the fitting structure of the present embodiment comprises an outer peripheral surface of the annular protrusion 8*b* and an inner peripheral surface of the annular recess 20*b*, and both the protrusion 8*b* and the recess 20*b* are formed in a circular shape centered on the output shaft 8*a* of the drive motor 8.

According to such a circular fitting structure, since the orbit of the deceleration mechanism 30 such as a planetary gear connected to the output shaft 8*a* is circular, it is possible to obtain a fitting structure in which a minimum space required for rotation is secured. In addition, since the fitting portion is the annular protrusion formed at the radially outer end of the end portion of the motor case 8A, it is easy to be incorporated into the recess 20*b*, and since the fitting is performed at the position of the maximum diameter, a stable fixed state can be obtained without backlash.

Figure 6:
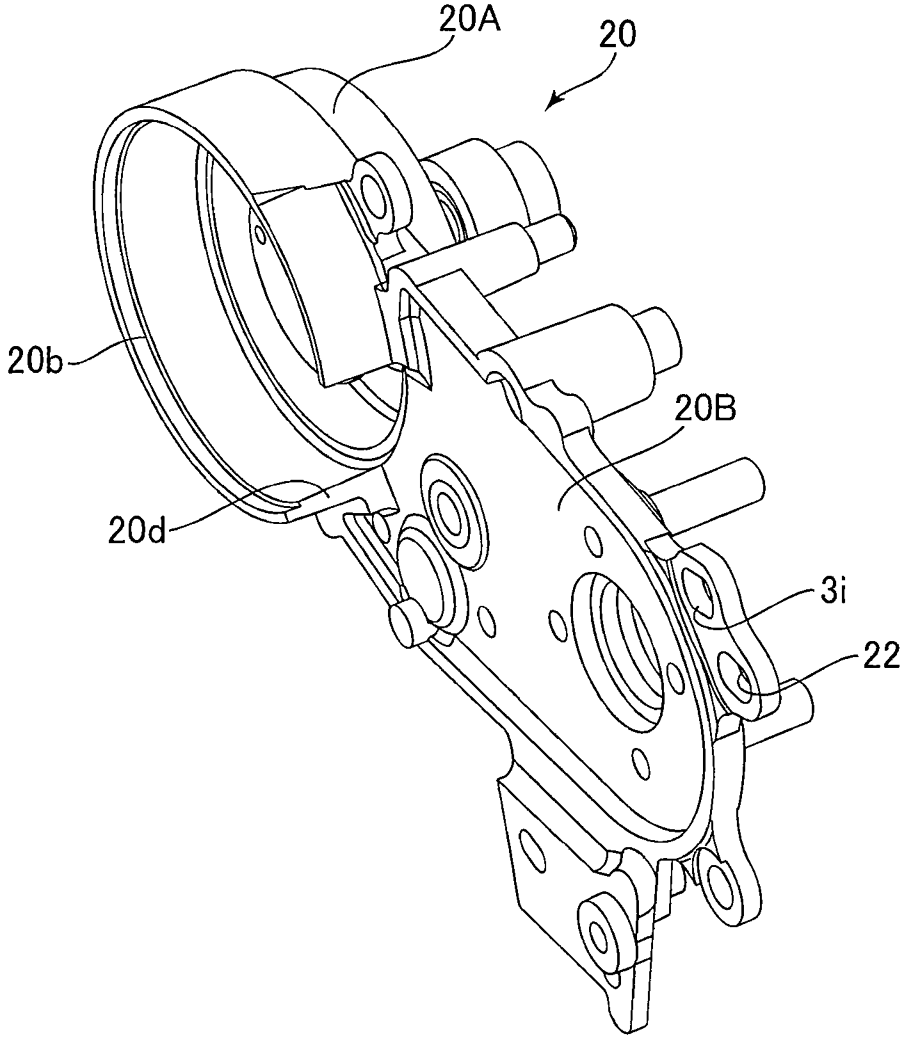
FIG. 6 is a perspective view illustrating a configuration of the set plate.
Figure 7:
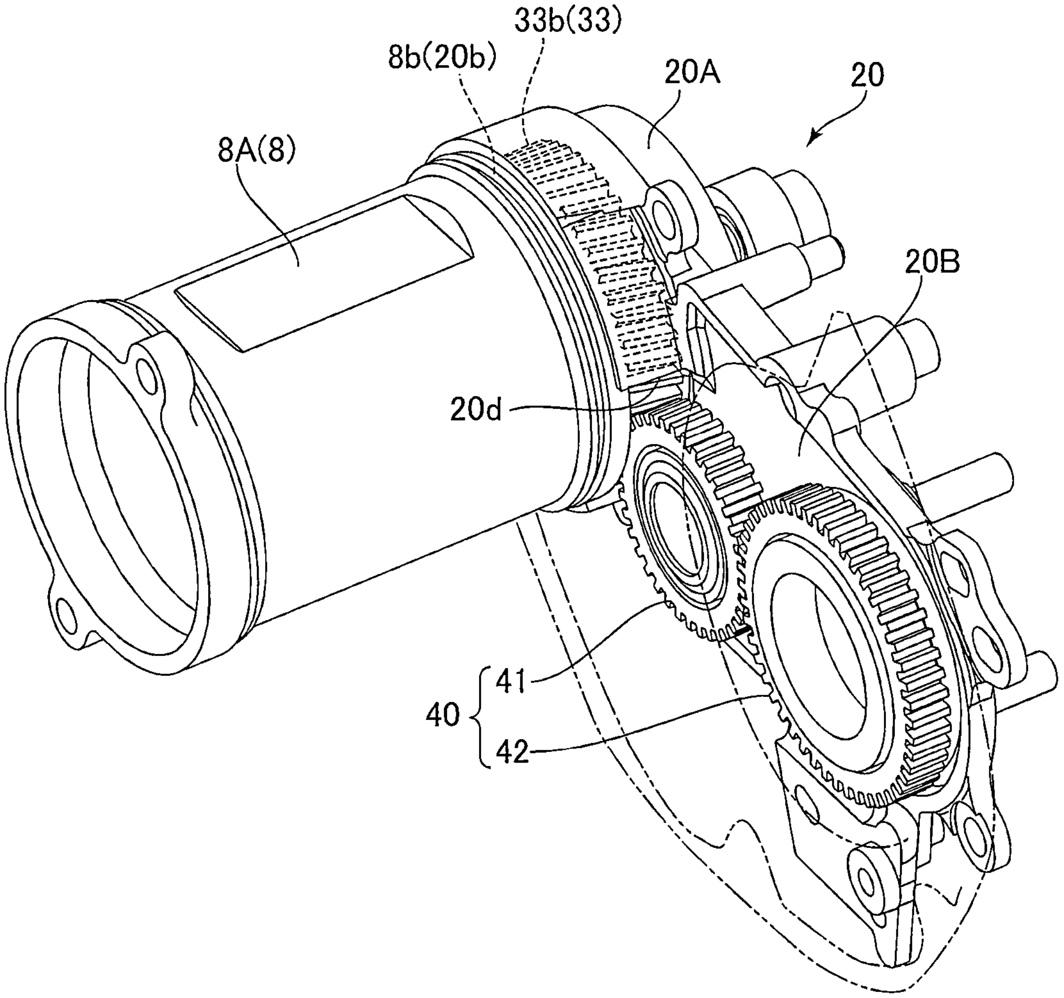
FIG. 7 is a perspective view illustrating a state in which a motor case is incorporated in the set plate.
Figure 8:
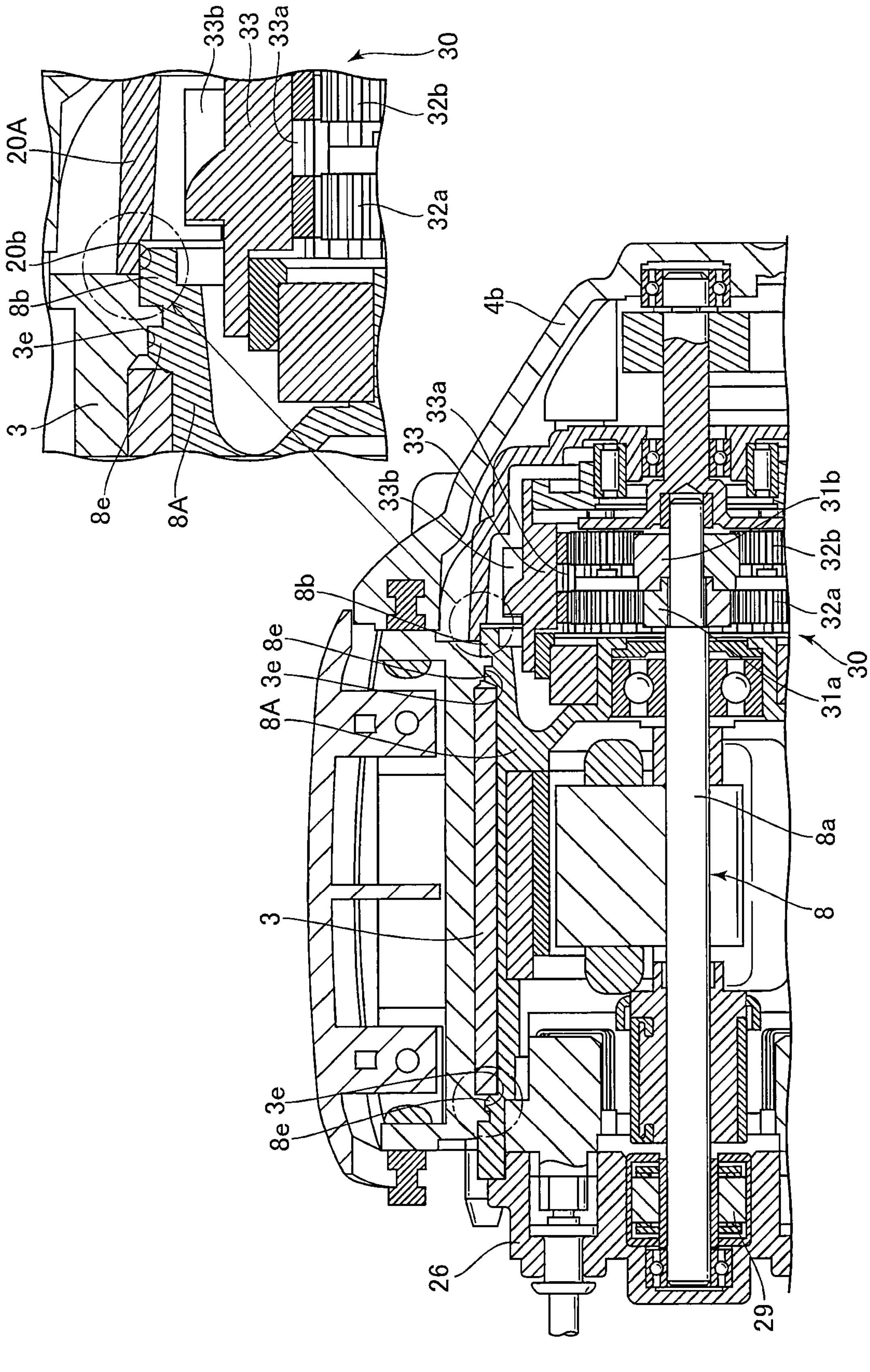
FIG. 8 is a cross-sectional view taken along an output shaft portion of the drive motor, illustrating a position where the set plate and the motor case are assembled.

Note that, in the present embodiment, since the internal gear 33 that outputs power to the outside is disposed in the housing part 20A, an arc-shaped notch portion 20*d* is formed on an outer peripheral surface of the housing part 20A so that the external teeth 33*b* and the gear 41 can mesh with each other (FIGS. 6 and 7).

Further, the protrusion 8*b* formed in the motor case 8A in the present embodiment serves as an assembly proof for positioning the set plate 20 attached to the frame 3. As described above, since the motor case 8A also serves as an assembly proof for positioning the set plate 20 with respect to the frame 3, it is not necessary to separately provide a boss or the like to position the set plate 20 on the frame 3, and the internal structure can be simplified to achieve miniaturization and weight reduction.

As described above, in the present embodiment, the protrusion 8*b* of the motor case 8A serves as an assembly proof of the set plate 20 with respect to the frame 3. In such a configuration, the motor case 8A is preferably configured to be stably fixed to the frame 3. For example, on the outer peripheral surface of the motor case 8A, arc-shaped protrusions 8*e* are formed at two positions spaced apart in the axial direction along the circumferential direction, and the recessed groove 3*e* into which the protrusion 8*e* is to be fitted is formed in the frame 3, whereby the motor case 8A can be stably held by the frame 3.

The embodiment of the present invention has been described above; however, the present invention is not limited to the above-described embodiment, and can be modified in various forms. The fitting structure between the motor case 8A and the set plate 20 may be a structure other than the annular recess 20*b* having the annular protrusion 8*b* and the notch portion 20*d*, such as a simple protrusion-recess fitting. In addition, a recess may be formed on the motor case side and a protrusion may be formed on the set plate side, or the inner peripheral surface of the protrusion 8*b* of the motor case 8A may be fitted to the outer peripheral surface of the housing part 20A of the set plate 20.

Further, as long as the driving force transmission mechanism 40 supported by the set plate 20 has a function of transmitting a rotational driving force of the drive motor 8 to the spool 7 side, various changes can be made, for example, transmitting power by a transmission belt or the like. Further, the set plate 20 and the manual handle 6 described above may be disposed on the left side plate side. Further, the clutch mechanism can be variously changed.

What is claimed is:

1. An electric fishing reel comprising:

a drive motor that is in a frame of a reel main body and rotationally drives a spool around which a fishing line is wound;

a motor case that houses a motor component of the drive motor and is attached to the frame;

a set plate attached to the frame; and a fitting structure that fits the motor case to the set plate, wherein the frame and the set plate are separate and discrete members, and the set plate houses a deceleration mechanism that reduces an output of the drive motor, and a gear constituting a driving force transmission mechanism that transmits a driving force to the spool is supported.

2. The electric fishing reel according to claim 1, wherein the fitting structure comprises a protrusion or a recess formed in the motor case and formed along an axial direction, and a recess or a protrusion formed in the set plate and into which the protrusion or the recess of the motor case is fitted, and the protrusion and the recess have a circular shape centered on an output shaft of the drive motor.

3. The electric fishing reel according to claim 2, wherein the protrusion formed in the motor case serves as an assembly proof of the set plate attached to the frame.

* * * * *